April 14, 1959 H. A. MACKIE 2,881,931
CONTROL MECHANISM FOR MATERIALS HANDLING MACHINES
Original Filed July 10, 1953 3 Sheets-Sheet 1
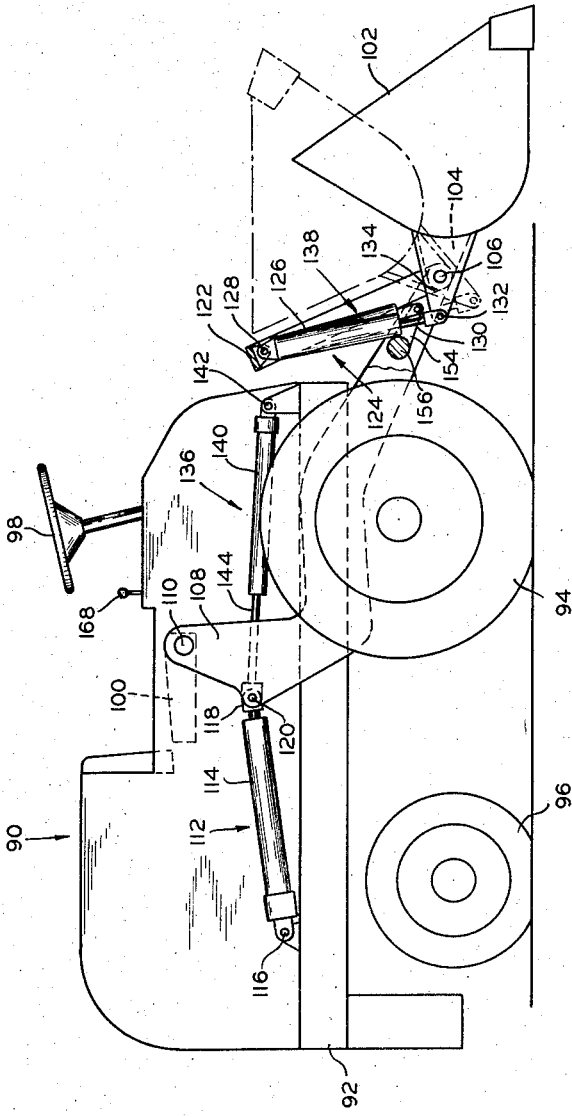
INVENTOR.
HARRY A. MACKIE
BY
ATTY.

April 14, 1959     H. A. MACKIE     2,881,931
CONTROL MECHANISM FOR MATERIALS HANDLING MACHINES
Original Filed July 10, 1953     3 Sheets-Sheet 2
FIG. 3
FIG. 2
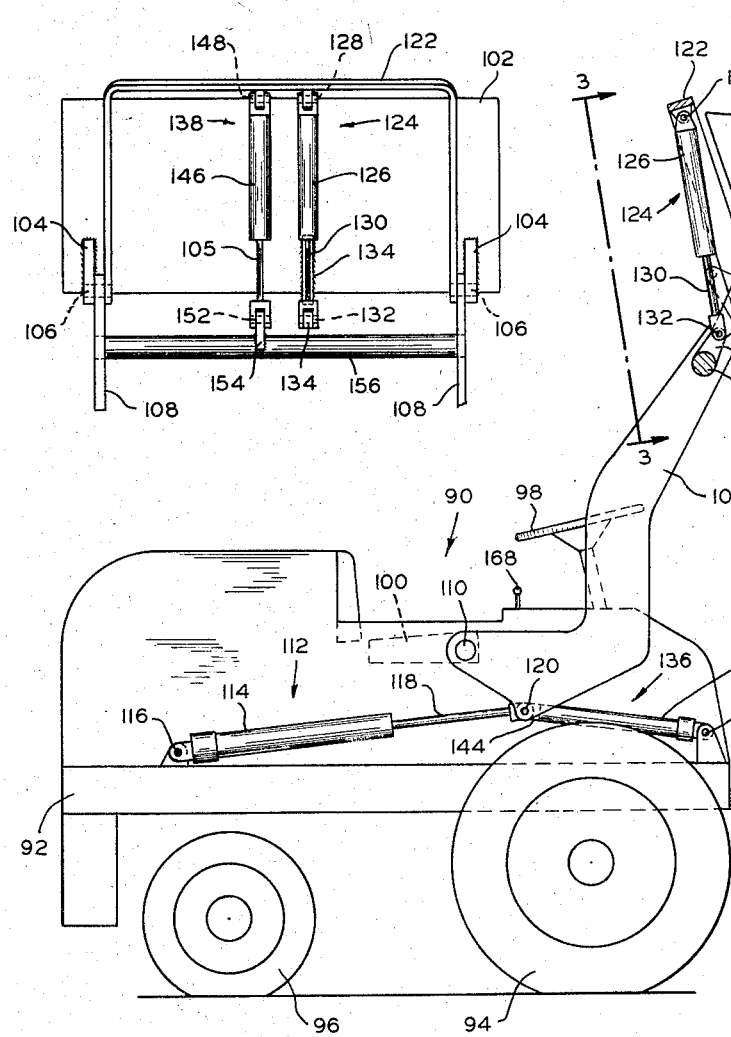
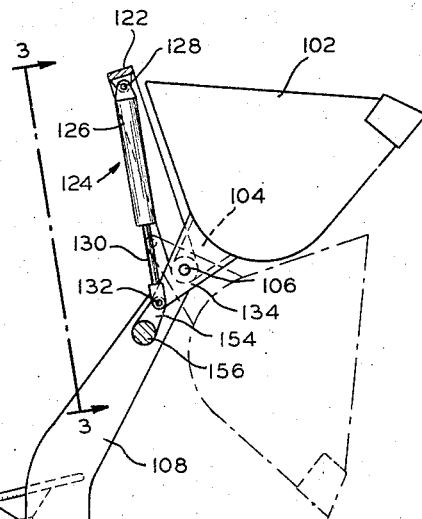
INVENTOR.
HARRY A. MACKIE
BY
ATTY.

April 14, 1959 H. A. MACKIE 2,881,931
CONTROL MECHANISM FOR MATERIALS HANDLING MACHINES
Original Filed July 10, 1953 3 Sheets-Sheet 3
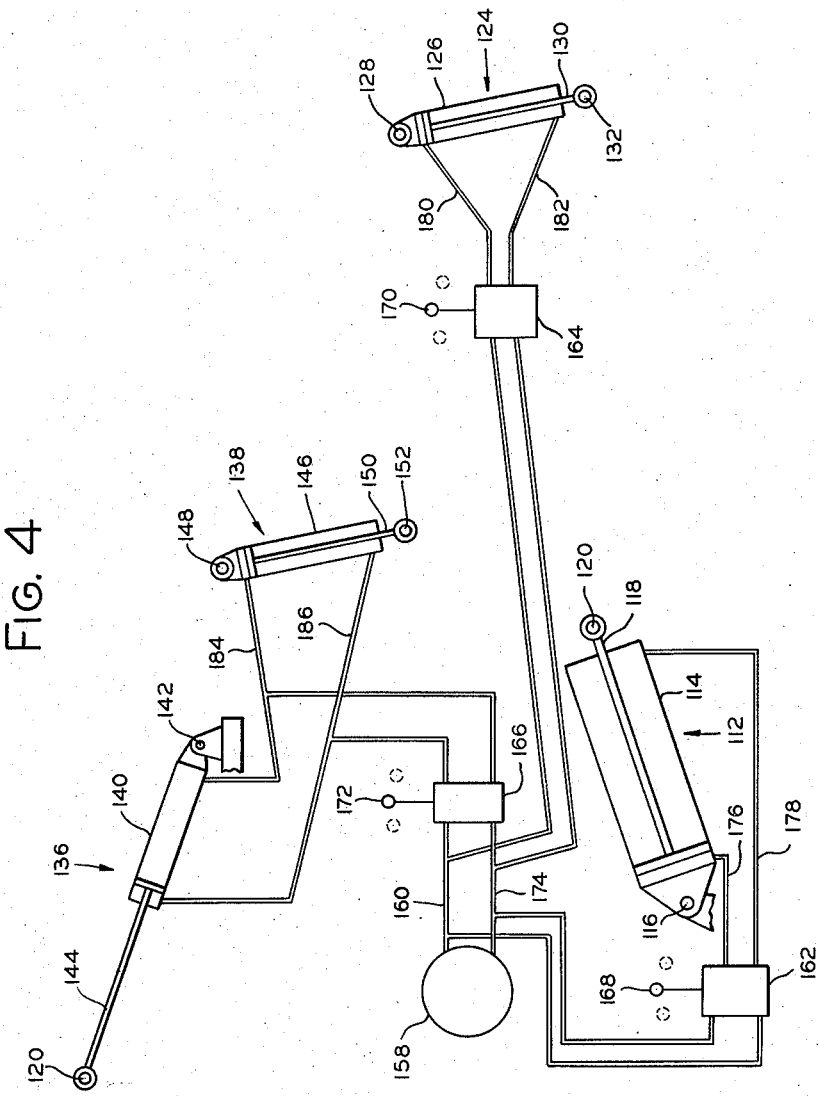
INVENTOR.
HARRY A. MACKIE
BY
J Frederick Bechtel United States Patent Office 2,881,931
Patented Apr. 14, 1959

2,881,931

CONTROL MECHANISM FOR MATERIALS HANDLING MACHINES

Harry A. Mackie, Troy Township, Wayne County, Mich., assignor to Clark Equipment Company, a corporation of Michigan Original application July 10, 1953, Serial No. 367,222. Divided and this application May 7, 1956, Serial No. 583,007

6 Claims. (Cl. 214—140)

My present invention relates to stabilizing means for the lifting and tilting mechanisms of materials handling machines which have power actuated elevatable and tiltable shovels, or other load handling devices, embodied with vehicles, such as industrial trucks, tractors and the like.

The present application is a division of my prior application, Serial No. 367,222, filed July 10, 1953, and now abandoned.

A machine with which my present invention is particularly adapted for embodiment comprises a power actuated shovel that is arranged at the forward end of a mobile vehicle. The shovel is pivoted at the forward end of forwardly extending arm means the latter of which is pivoted, at its rear end, to the vehicle frame. The shovel is elevated by pivoting the arm means.

It is an object of my present invention to provide automatically operable means which will, upon pivoting of the arm means, effect synchronized tilting movement of the shovel or other load engaging device relative to the arm means, for maintaining the shovel in and predetermined angular position relative to the ground.

In the accomplishment of the foregoing object, I provide a generally inverted U-shaped synchronizer frame or yoke which is pivotally mounted, at the ends of its legs, to the arm means, about an axis common to the pivotal mounting of the shovel to the arm means. First and second hydraulic actuating assembly means are carried by the synchronizer frame with the first assembly being arranged for tilting the shovel relative to the synchronizer frame and arm means, and with the second assembly being arranged for tilting the synchronizer frame and shovel relative to the arm means. Third hydraulic actuating assembly means is arranged between the vehicle frame and the arm means, and is responsive to pivotal movement of the latter.

The first and third assemblies are interconnected by hydraulic fluid lines so that the third assembly will serve to actuate the first assembly synchronously during pivoting of the arm means, in order automatically to tilt the shovel relative to the arm means and synchronizer frame, for maintaining a section of the shovel cut by a given horizontal plane substantially parallel to the ground. Manually operable valve means is provided for selectively connecting the second assembly with a source of fluid pressure whereby the shovel may be tilted to any predetermined angular position relative to the ground.

Now, in order to acquaint those skilled in the art with the manner of constructing and using materials handling machines in accordance with the principles of my present invention, I shall describe in connection with the accompanying drawings, a preferred embodiment of my invention.

In the drawings:

Figures 1 and 2 are side elevational views of a mobile vehicle and a power actuated shovel embodying one form of my present invention, with the shovel being shown in various operating positions; a portion of the shovel operating mechanism is cut away in both these figures in order to show more clearly the details of this mechanism.

Figure 3 is a view taken along the line 3—3 in Figure 2, looking in the direction indicated by the arrows, and shows a portion of the preferred form of my present invention; and Figure 4 is a diagrammatic showing of the fluid circuit of the preferred embodiment of my present invention.

Referring now to Figures 1 through 4, I shall describe one embodiment of my present invention. A mobile vehicle or industrial truck is indicated generally by the reference numeral 90 and has a main frame 92 which at its forward end is supported on drive wheels 94 and at its rear end on steering wheels 96. The rear steering wheels 96 are operatively interconnected with the hand steering wheel 98 which is disposed forwardly of an operator's seat 100.

A shovel 102 is arranged at the forward end of the truck 90. Spaced brackets 104 are secured to the shovel 102 and are pivotally mounted on transverse stub shafts 106 carried at the forward ends of a pair of forwardly extending arm members 108 arranged at either side of the truck. The arm members 108 are pivotally mounted at 110 to a transverse shaft journalled in the main frame 92.

The means for effecting pivotal movement of the arm members 108 comprises a pair of movable members 112, one on each side of the machine, which are connected between the main frame 92 and one of the arm members 108. The arm pivoting means, which is indicated generally at 112, comprises a cylinder 114 pivotally mounted at 116 to the main frame 92, and a piston rod 118 pivotally mounted at 120 to the adjacent arm member 108.

Mounted on the stub shafts 106, which pivotally support the shovel brackets 104, are the legs of a generally inverted U-shaped frame member or yoke 122.

In order to effect synchronized tilting of the shovel 102 relative to the arm members 108 as the latter are pivoted suitable means, to be described hereinafter in detail, is provided for tilting the shovel 102 and the yoke 122 relative to the arm members 108. Additional means are provided for tilting the shovel 102 relative to the synchronizer frame 122.

The means for effecting tilting of the shovel 102 relative to the synchronizer frame 122 and the arm members 108 comprises an hydraulic actuating assembly indicated generally by the reference numeral 124. The assembly 124 comprises a cylinder 126 pivotally connected at 128 to the bight portion of the U-shaped frame 122, and a piston rod 130 pivotally connected at 132 to a bracket 134 which is secured to the shovel 102.

The means for tilting the synchronizer frame 122 and the shovel 102 relative to the arm members 108 comprises hydraulic actuating assemblies 136 and 138 each of which includes a pair of relatively movable members. The assembly 136, which is arranged at one side of the truck, comprises a cylinder 140 pivotally mounted at 142 to the main frame 92, and a piston rod 144 pivotally mounted at 120 to the adjacent arm member 108. The assembly 138 comprises a cylinder 146 pivotally mounted at 148 to the bight portion of the U-shaped frame 122, and a piston rod 150 pivotally mounted at 152 to a lever 154 secured to a member 156 fixed at its ends to the arm members 108.

Referring now to Figure 4, I shall describe the fluid circuit which is associated with the aforedescribed hydraulic actuating assemblies 112, 124, 136 and 138. The fluid circuit comprises a source of fluid pressure 158 the pressure side of which is connected, through a fluid line 160, with three valve assemblies indicated generally by the reference numerals 162, 164 and 166, which, respectively, are provided with control levers 168, 170 and 172. A fluid return line 174 interconnects the valves 162, 164 and 166 with the source of fluid pressure 158.

A pair of fluid lines 176 and 178 interconnect the valve 162 with the cylinder 114 of the elevating hydraulic actuating assembly 112. A pair of fluid lines 180 and 182 interconnect the valve 164 with the cylinder 126 of the shovel tilting actuating assembly 124. The valve 162 and the lines 176 and 178, and the valve 164 and the lines 180 and 182 are so arranged that when one line of each pair is under pressure, the other line of each pair is under bleed. An additional pair of fluid lines 184 and 186 interconnect the valve 166 with the cylinders 140 and 146 of the synchronizer frame tilting assemblies 136 and 138.

In the operation of my invention, after a load has been engaged by the shovel 102, fluid under pressure may be, by actuation of the control lever 170, selectively admitted through the fluid line 180, to the upper end of the cylinder 126 of the tilt assembly 124 for distending the piston rod 130 and causing counter-clockwise pivotal movement of the shovel 102. After the shovel 102 has been tilted from the load engaging solid line position, shown in Figure 1, to the load carrying position shown in dot-dash lines, the shovel 102 may be elevated by pivoting the arm members 108. Such pivotal movement of the arm members 108 may be effected by actuating the control lever 168 of the valve 162 for admitting fluid under pressure, through the fluid line 176, to the left end of the cylinder 114 of the elevating actuating assembly 112.

In order to maintain the shovel 102 in a predetermined angular position relative to the ground, during elevation of the shovel 102, the hydraulic actuating assemblies 136 and 138 are operable for effecting synchronized tilting of the synchronizer frame 122 and shovel 102 relative to the arm members 108.

The described synchronized tilting is effected through the actuating of the assembly 136 by the pivoting of the arm members 108. During clockwise pivoting of the arms 108, the piston rod 144 is urged outwardly of the cylinder 140, and pressure is thereby exerted on the fluid in the line 186 causing fluid flow therethrough to the lower end of the cylinder 146. Such fluid flow causes the piston rod 150 to move upwardly for tilting the shovel counter-clockwise. Simultaneously, fluid is moved from the upper end of the cylinder 146, through the line 184, to the right end of the cylinder 140. If the piston rod 144 is urged inwardly, upon counter-clockwise movement of the arms 108, as when the arms are pivoted upwardly, will be forced through the lines 184 and 186 in a reverse direction for tilting the shovel clockwise.

Fluid under pressure may be selectively admitted initially to the synchronizer fluid lines 184 and 186 through suitable manual actuation of the control lever 172 of the valve 166. The valve 166 is further operable for supplementing the fluid in the lines 184 and 186, to compensate for leakage therefrom, and for changing the position of the synchronizer frame 122 relative to the arm members 108.

The contents of the shovel 102 may be emptied by selectively admitting fluid under pressure, through the line 182, to the lower end of the cylinder 126 of the tilt actuating assembly 124 for retracting the piston rod 130. Retraction of the piston rod 130 effects clockwise pivotal movement of the shovel 102 relative to the synchronizer frame 122 and arm members 108 thereby moving the shovel 102 from the solid line position shown in Figure 2 to the dot-dash line position.

From the foregoing description it will be readily apparent that I have provided automatically operable means which will, upon pivoting of the arm members, effect synchronized tilting movement of the shovel relative to the arm members for maintaining the shovel or other load handling device in any predetermined angular position relative to the ground. It will be further observed that not only is the mechanism of my present invention simple in structure and efficient in operation, but it is also inexpensive and may be readily adjusted for various conditions of operation.

Now while I have shown and described what I believe to be a preferred embodiment of my present invention, it will be understood that various modifications and rearrangements may be made therein without departing from the spirit and scope of my invention.

I claim:

1. For use with a vehicle having a main frame, the combination of a load handling device, forwardly extending arm means pivoted at the rear end to the vehicle frame and at the forward end to said device, power actuated means carried by the vehicle and having connection with said arm means for effecting pivotal movement of the latter whereby said device may be raised and lowered, a synchronizer member carried by said arm means, first and second hydraulic actuating assembly means connected to said synchronizer member for tilting said load handling device relative to said arm means, manually operable means for effecting actuation of said first hydraulic actuating assembly means, third hydraulic actuating assembly means between said main frame and said arm means and responsive to pivotal movement of the latter, and said second and third hydraulic actuating assembly means being interconnected by fluid lines whereby said third hydraulic actuating assembly means serves to actuate said second hydraulic actuating assembly means during elevation of said device so as to tilt automatically said device relative to said arm means for maintaining a section of the device cut by any given horizontal plane substantially parallel to the ground.

2. For use with a vehicle having a main frame, the combination of a shovel, forwardly extending arm means pivoted at the rear end to the vehicle frame and at the forward end to said shovel, power actuated means carried by the vehicle and having connection with said arm means for effecting pivotal movement of the latter whereby said shovel may be raised and lowered, a synchronizer frame pivotally mounted to said arm means about an axis common to the pivotal mounting of said shovel to said arm means, first means carried by said synchronizer frame for tilting said shovel relative to said synchronizer frame and said arm means, second means carried by said synchronizer frame for tilting said synchronizer frame and said shovel relative to said arm means, manually operable means for effecting actuation of said first shovel tilting means, and means responsive to pivotal movement of said arm means for effecting actuation of said second shovel tilting means whereby said synchronizer frame and said shovel are automatically tilted relative to said arm means during elevation of said shovel for maintaining a section of the shovel cut by any given horizontal plane substantially parallel to the ground.

3. For use with an industrial truck having a main frame, the combination of a shovel, forwardly extending arm means pivoted at the rear end to the truck frame and at the forward end to said shovel, power actuated means carried by the truck and having connection with said arm means for effecting pivotal movement of the latter whereby said shovel may be raised and lowered, first and second hydraulic actuating assembly means carried by said arm means for tilting said shovel relative to said arm means, third hydraulic actuating assembly means between said main frame and said arm means and responsive to pivotal movement of the latter, first, second and third four-way valves, a source of fluid pressure, a pair of fluid lines between said source of fluid pressure and said first, second and third four-way valves, one line constituting a pressure line and the other constituting a return line, a pair of fluid lines between said first four-way valve and said power actuated means whereby the latter may be actuated selectively for effecting pivotal movement of said arm means, a pair of fluid lines between said second four-way valve and said first and third hydraulic actuating assembly means whereby the relative positions of said first and third hydraulic actuating assembly means may be adjusted selectively, said third hydraulic actuating assembly means serving to actuate said first hydraulic actuating assembly means during elevation of said shovel so that said shovel is automatically tilted relative to said arm means for maintaining a section of the shovel cut by any given horizontal plane substantially parallel to the ground, and a pair of fluid lines between said third four-way valve and said second hydraulic actuating assembly means whereby the latter may be actuated selectively for effecting tilting of said shovel relative to said arm means.

4. In a vehicle having a main frame, the combination of a load handling device, outwardly extending arm means pivoted to the vehicle frame and having said device pivotally supported thereon near the outer end of the arms, power actuated means carried by the vehicle and having connection with said arm means for effecting pivotal movement of the latter whereby said device may be raised and lowered, a synchronizer frame member carried by said arm means and first and second fluid means connected to the said synchronizer frame member for tilting said device relative to said arm means, manually operable means for selectively effecting actuation of said first fluid means whereby said device may be tilted, and means responsive to pivotal movement of said arm means for effecting actuation of said second fluid means whereby said device is automatically tilted relative to said arm means during elevation of said device for maintaining a section of the device cut by any given horizontal plane substantially parallel to the ground.

5. In a materials handling machine having pivoted outwardly extending arm means, a load handling device pivotally connected to the arm means near the outer end thereof, and power actuated means for pivoting the arm means to raise and lower the load handling device, the combination of a synchronizer frame pivotally mounted on the arm means near the outer end thereof, a first hydraulic actuator connected between said synchronizer frame and the load handling device for selectively tilting the latter, a second hydraulic actuator connected between said synchronizer frame and the arm means, and an hydraulic device operated by the arm means during raising and lowering operation thereof for supplying hydraulic fluid to said second actuator for automatically tilting said synchronizer frame and the load handling device relative to the arm means during raising and lowering of the arm means for maintaining the synchronizer frame and load handling device in a selected position relative to the ground during such raising and lowering operation.

6. In a materials handling machine having pivoted outwardly extending arm means and a load handling device pivotally connected to the arm means near the outer end thereof to be raised and lowered by pivoting operation of the arm means, the combination of a member carried by the arm means and two fluid actuators connected to the said member and arranged to tilt the load handling device, manual means for selectively operating a first one of said actuators for tilting the load handling device, and a fluid device responsive to pivoting movements of the arm means for supplying fluid to the second said fluid actuator for automatically tilting the load handling device relative to the arm means during pivoting operation of the arm means to raise and lower the load handling device.

References Cited in the file of this patent

UNITED STATES PATENTS

| | | |
|---|---|---|
| 2,613,822 | Stanley | Oct. 14, 1952 |
| 2,620,930 | Mullgardt | Dec. 9, 1952 |
| 2,731,162 | Walstrom | Jan. 17, 1956 |

UNITED STATES PATENT OFFICE
CERTIFICATE OF CORRECTION

Patent No. 2,881,931                                        April 14, 1959

Harry A. Mackie

It is hereby certified that error appears in the printed specification of the above numbered patent requiring correction and that the said Letters Patent should read as corrected below.

Column 1, line 27, for "at the" read -- to the --; line 35, for "in and" read -- in any --; column 3, line 47, after "upwardly," insert -- fluid --.

Signed and sealed this 28th day of July 1959.

(SEAL)
Attest:

KARL H. AXLINE                                            ROBERT C. WATSON
Attesting Officer                                          Commissioner of Patents